United States Patent [19]

Hirbod

[11] 4,181,319
[45] Jan. 1, 1980

[54] SKI SKATEBOARD

[76] Inventor: Farrokh Hirbod, 6424 Via Colinita, Rancho Palos Verdes, Calif. 90274

[21] Appl. No.: 943,039

[22] Filed: Sep. 18, 1978

Related U.S. Application Data

[63] Continuation-in-part of Ser. No. 900,360, Apr. 26, 1978, abandoned.

[51] Int. Cl.² ............................................. B62M 1/04
[52] U.S. Cl. .................................. 280/221; 272/70.3; 280/11.115; 280/220; 280/259
[58] Field of Search ............... 280/221, 220, 224, 225, 280/226 A, 226 R, 11.11 R, 242, 244, 247, 252, 256, 259, 87.01, 87.04, 127, 128, 130, 114, 115; 272/70.3

[56] References Cited

U.S. PATENT DOCUMENTS

| | | | |
|---|---|---|---|
| 1,018,405 | 2/1912 | Brock | 280/223 |
| 1,598,431 | 8/1926 | Foster | 280/222 |
| 1,652,284 | 12/1927 | Madsen | 280/252 |
| 1,800,123 | 4/1931 | Wagen | 280/221 |
| 2,174,990 | 10/1939 | Maguire | 280/11.11 |
| 2,472,797 | 6/1949 | Foulke | 280/226 A |
| 2,536,569 | 1/1951 | Purkey | 280/221 |
| 2,707,112 | 4/1955 | Ludwigson et al. | 280/221 |
| 3,164,391 | 1/1965 | O'Neal | 280/252 |
| 3,318,614 | 5/1967 | Lee | 280/221 |
| 3,419,267 | 12/1968 | Stolle | 280/220 |
| 3,438,642 | 4/1969 | Kite et al. | 280/87.04 |
| 3,618,970 | 11/1971 | Friggard | 280/87.01 |
| 3,684,305 | 8/1972 | McDonald et al. | 280/11.19 |

FOREIGN PATENT DOCUMENTS

419972  5/1933  United Kingdom ................ 280/226 A

Primary Examiner—Joseph F. Peters, Jr.
Assistant Examiner—Donn McGiehan
Attorney, Agent, or Firm—Nilsson, Robbins, Dalgarn, Berliner, Carson & Wurst

[57] ABSTRACT

A ski-skateboard device driven by intermittent downward pressure applied to two foot pads or a pair of hand-operated handles. A disk-shaped platform has a fixed central flange extending downward. A suspension assembly is provided on each side of the central flange with two axles being rotatably attached to each suspension assembly. At least two axles have eccentric portions to which one or more force application rods are attached. Each axle has an outer end to which a wheel is fixed, and an inner end connected to the suspension assembly. The relative position of eccentric portions of selected pairs of axles may be maintained to allow propulsion by a rocking or treading motion supplied by the hands or feet. The suspension assembly may be a suspension spring apparatus or a shock absorber with a pivotal plate apparatus so that at least the right and left portions of the suspension system are independently movable in a vertical direction. A brake mechanism may be provided to force a brake shoe against one of the axles and a flywheel may be provided for stability.

20 Claims, 16 Drawing Figures

SKI SKATEBOARD

CROSS-REFERENCE TO RELATED APPLICATION

This application is a continuation-in-part of co-pending application Ser. No. 900,360, filed Apr. 26, 1978, now abandoned.

BACKGROUND OF THE INVENTION

The present invention relates to skateboards and, in particular, to propelled skateboards having improved suspension capabilities.

Self-propelled skates having various types of suspensions have been devised over the years. For example, in U.S. Pat. No. 2,536,569 a propelled wheel skate is shown wherein an independent skate is provided for each foot, each skate being propelled by a propulsion apparatus coupled to an axle by appropriate linkage. The linkage is provided with a gear assembly which allows movement of the drive gear in only one direction. In addition, the axles are not independently movable in a vertical direction. By contrast, the present invention has only one "skate" device for both feet rather than a skate for each foot. In addition, the propelling mechanism of the present invention is connected directly to the axle at an eccentric portion thus eliminating the linkage and sprocket or chain mechanism required by the above-identified patent. In addition, rotation of the wheel in a single direction is provided in one or more of the drive wheels rather than in a separate drive gear with at least the suspension of oppositely positioned axles being independently movable in a vertical direction.

In U.S. Pat. Nos. 3,684,305, 3,419,267, and 3,438,642, a single board or plate onto which both feet are placed is shown for skiing. However, neither of these devices incorporates a propelling mechanism as described by the present invention.

In U.S. Pat. No. 3,618,970, a central rib portion is provided in an apparatus designed to receive both feet. However, the central rib in that patent is hinged to the platform with the plates fixed to the platform. By contrast, the embodiments of the present invention incorporating a central rib have the central rib fixed to the platform with pivot plates movable relative to the platform. Consequently, the effect and operation of the two inventions are entirely different. In addition, U.S. Pat. No. 3,618,970 does not incorporate any propulsion means as is disclosed by the present invention.

Various patents can be found, for example, U.S. Pat. Nos. 1,800,123 and 3,318,614, which have propulsion mechanisms which utilize eccentric axle regions coupled to reciprocating members to obtain circular motion. However, none provide the novel independent suspension mechanism of the present invention.

Finally, U.S. Pat. Nos. 2,472,797 and 2,174,990 and British Pat. No. 419,921 all disclose shock absorber-type drive mechanisms. However, none incorporate a shock absorber without linkage connecting the shock absorber to the axle. By contrast, in the embodiments of the present invention incorporating shock absorber-type drive mechanisms, no linkage is utilized with the shock absorber members driving the eccentric portion of the axle directly. Thus, the present invention provides a simpler drive mechanism. In addition, none of the above patents incorporates a suspension independently movable relative to oppositely positioned wheels.

SUMMARY OF THE INVENTION

The present invention comprises a skateboard having a platform with at least one slot therethrough. A suspension means is interconnected to the platform and comprises a first set of axles positioned on a first side of the platform and a second pair of axles positioned on a second side of the platform. Each axle is rotatable about its longitudinal axis with at least one of the axles having an eccentric portion along its length. The first set of axles is independently movable relative to the second set of axles in a vertical plane relative to the plane of the platform. A plurality of wheels, one attached to an end of each axle, are provided with each wheel attached to the end of an axle having an eccentric portion being adapted for rotating freely in only one direction. At least one drive means is rotatably coupled to the eccentric portion of one of the axles having an eccentric portion with the drive means extending through the slot in the platform for being reciprocated by an operator to impart rotation to the attached axle.

The skateboard apparatus of the present invention may incorporate a flange depending down from the platform. In such an arrangement, the suspension assembly may comprise means for pivotally attaching one end of each of the first set of axles remote from the respectively attached wheels to one side of the flange and means for pivotally attaching one end of the second set of the axles remote from the respectively attached wheels to the other side of the flange. The axles are attached to be rotatable relative to the flange with each axle also being pivoted relative to the flange. A first pivot plate is hinged along a first of its edges to the one side of the flange for pivoting about an axis in the plane of the flange. The first set of axles are rotatably attached to the first pivot plate at fixed spaced locations along a second of its edges generally parallel to the first of its edges. A second pivot plate is hinged along a second of its edges to the other side of the flange for pivoting about an axis in the plane of the flange. The second set of axles are also rotatably attached to the second pivot plate at fixed spaced locations along a second of its edges generally parallel to the first of its edges.

In another embodiment, the pivot plates may be respectively replaced with first and second vertical position varying means.

Each vertical position varying means is interconnected between the platform and the applicable set of axles at a location remote from the flange. Each axle in the applicable set of axles is rotatable relative to the vertical position varying means.

Spacer means are interconnected between the axles in the first and second sets by axles at a location remote from the flange for maintaining a substantially constant spacing between the axles in the respective sets of axles.

In yet another embodiment of the present invention, vertically resilient means, such as leaf-type springs, are interconnected between the platform and two spaced locations along the axle.

In each of the above embodiments, a flywheel assembly may be incorporated for being rotated in response to the rotation of at least one of the axles. An appropriate clutch apparatus is connected to the flywheel for allowing the flywheel to rotate at an angular velocity greater than the angular velocity of the axle interconnected to rotate the flywheel.

The skateboard of the present invention may also incorporate a brake apparatus having a brake shoe interconnected for applying pressure against at least one of the axles for slowing the rotation of that axle.

BRIEF DESCRIPTION OF THE DRAWINGS

The invention will be better understood from the detailed description below taken in conjunction with the drawings wherein like reference characters refer to like parts throughout and in which.

DETAILED DESCRIPTION

Figure 1:
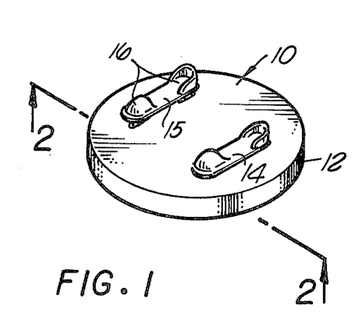
FIG. 1 is illustrative of the platform and the foot pads of the present invention.

Referring first to FIG. 1, the skateboard apparatus in accordance with the present invention comprises a platform 10, which may have a peripheral depending flange 12 which may be weighted to lower the center of gravity. Foot pads 14 and 15 are mounted above the platform 10, as will be described hereinafter, to receive the feet of an individual standing on the device. Retaining means 16, such as rubber water ski receptacles or spring-loaded snow ski receptacles, are secured to each foot pad 14 and 15 to releasably hold the feet on the respective foot pads.

Figure 2:
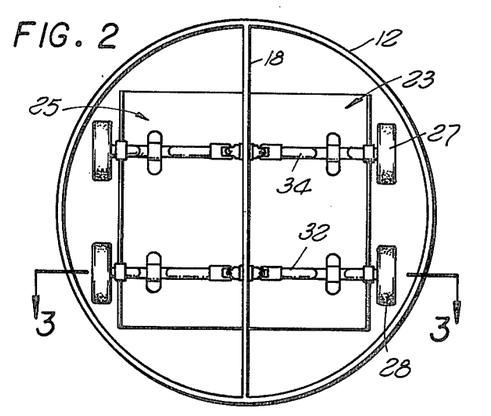
FIG. 2 is a cross-sectional view taken along the line 2—2 of FIG. 1 illustrating the arrangement of the suspension assemblies on either side of the central flange in accordance with the present invention.
Figure 3:
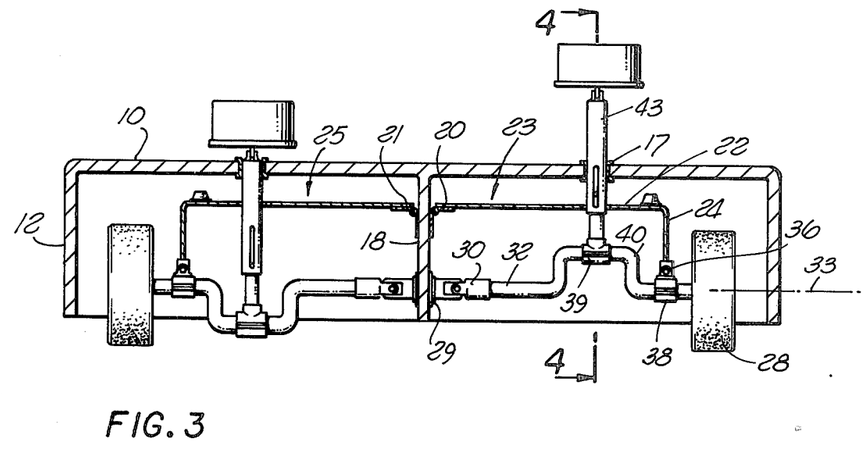
FIG. 3 is a cross-sectional view taken along the line 3—3 of FIG. 2 showing one axle and shock absorber assembly.
Figure 5:
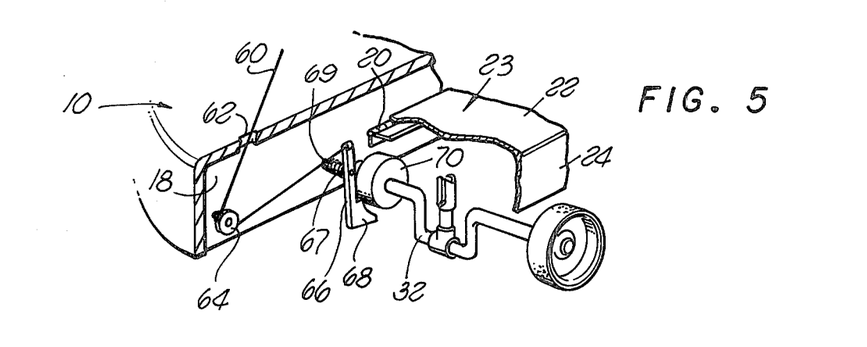
FIG. 5 is a partial-sectional perspective view illustrating the brake mechanism in accordance with a second embodiment of the present invention.

As shown in FIGS. 2, 3, 5, 7, and 8, a flange 18 is rigidly attached and depends from the bottom and along a length of the platform 10. In one embodiment of the invention, a square or rectangular plate 23 is pivotally connected to one side of the central flange 18 by means of a longitudinal hinge 20, as illustrated in FIGS. 3 and 5, to extend horizontally outward from the flange 18. The plate 23 preferably has a substantially horizontal portion 22 and an outer depending vertical portion 24 which extends downwardly away from the circular platform 10. Thus, the plate 23 is capable of independent vertical rotation about the hinge 20. Similarly, on the opposite side of the central flange 18, a second square or rectangular plate 25 is pivotally connected to the central flange 18 by means of a second longitudinal hinge 21 whereby the plate 25 is capable of independent vertical rotation about the hinge 21.

Figure 4:
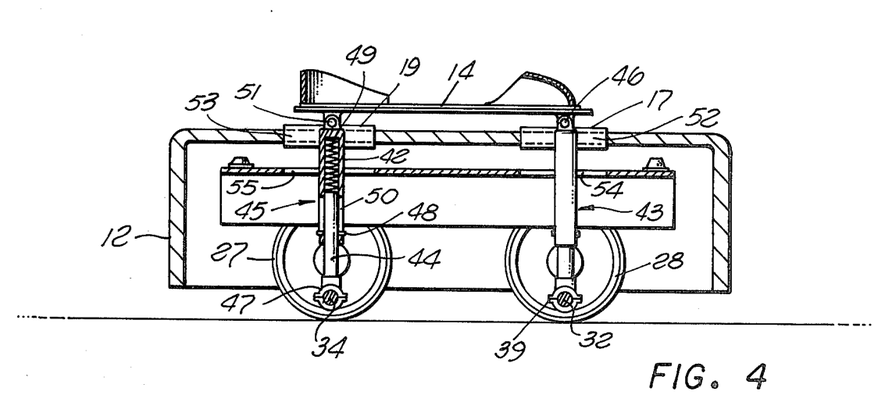
FIG. 4 is a cross-sectional view taken along the line 4—4 of FIG. 3 showing one shock absorber assembly partly broken away.
Figure 7:
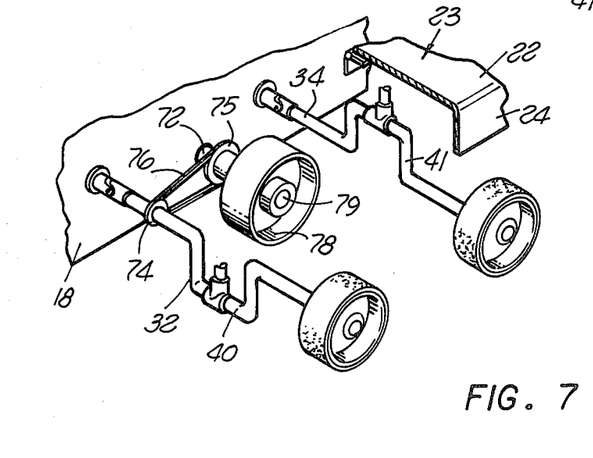
FIG. 7 is a partial-sectional perspective view showing one side of the suspension assembly incorporating a flywheel assembly in accordance with a third embodiment of the present invention.

As shown in the embodiments illustrated in FIGS. 2, 4, and 7, and with reference to the plate 23 on one side of the central flange 18, two wheels 27 and 28 are independently pivotally and rotatably connected to the side of the central flange 18 by a bearing assembly. As shown in FIG. 3, the bearing assembly comprises a bearing 29 secured to the central flange 18 and a universal joint 30 connecting the bearing 29 and an axle 32. The wheel 28 is rigidly connected to the end of the axle 32 remote from the flange 18. The universal joint 30 allows vertical movement of the axle 32 and the wheel 28, as well as rotational motion of the axle 32 and the wheel 28 about a longitudinal axis 33 of the axle 32.

Referring now particularly to FIG. 3, a universal joint or hinge 36 is secured to the edge of the vertical portion 24 of the pivot plate 23 by a bearing 38. In this manner, the axle is allowed to rotate about its longitudinal axis 33 and to pivot vertically to a small degree about the universal joint 30.

Referring to FIG. 2, a second axle 34 is similarly positioned and attached to the pivot plate 23 by bearings and universal joints corresponding to those described in conjunction with the axle 32. Thus, the connection between the outer ends of each axle 32 and 34 and the pivot plate 23 prevent the wheels 27 and 28 from moving horizontally with respect to each other. The assembly used on the opposite side of the central flange 18 in association with the pivot plate 25 is identical to that described above.

Referring to FIG. 3 together with FIG. 7, each axle on each side of the central flange 18 may have an eccentric portion at a point between the wheel on the end of each axle and the flange 18. For example, in FIG. 7, the axle 32 is shown with an eccentric portion 40 and the axle 34 is shown with an eccentric portion 41. Eccentric portions 40 and 41 are respectively connected to the front and back of the foot pad 14 by shock absorber-type mechanisms 43 and 45. Thus, in FIG. 4, the shock absorber-type mechanism 43 is connected to the front portion of the foot pad 14 at the bottom thereof, with a hinge 46. The opposite end of the shock absorber mechanism 43 is rotatably connected to the axle 32 at the eccentric portion 40 by a bearing 39 (see also FIG. 3). A similar shock absorber-type mechanism 45 is connected to the rear portion of the foot pad 14 with a hinge connection 51, and to the axle 34 by a bearing 37. Both shock absorber-type mechanisms are similarly constructed, so only shock absorber 45 will be described in detail.

The shock absorber assembly 45 comprises a hollow cylindrical sleeve 42 which is attached to the foot pad 14 by the hinge 51, and an inner cylindrical rod 44 which reciprocates within the sleeve 42. A spring 49, housed within the top portion of the cylindrical sleeve 42 and against the rod 44, biases the foot pad 14 in the upward direction. Slots 50 in the side walls at the lower end of the cylindrical sleeve 42, in conjunction with a pin 48 in the rod 44, provide a means whereby the motion of the rod 44 relative to the cylindrical sleeve 42, may be limited.

In operation, the hinge 51 connects the top end of the cylindrical sleeve 42 to the foot pad 14 so that the back part of the foot pad 14 may rotate to a limited degree with respect to the shock absorber mechanism 45. Similarly, the bearing 47 connecting the eccentric portion of the axle 34 to the lower end of the rod 44 permits rotation of the shock absorber mechanism 45 with respect to the axle 34 while at the same time permitting the axle to rotate within the bearing 47.

In a similar fashion, the front axle 32 is connected to the front part of the foot pad 14 by a shock absorber mechanism 43 with a hinge 46 connecting the top part of the shock absorber mechanism 43 to the bottom part of the foot pad 14 and a bearing 39 connecting the shock absorber mechanism 43 to the eccentric portion 40 (see FIG. 7) of the axle 32.

An identical assembly as that described in connection with the right portion of the ski-skateboard assembly of the present invention is utilized on the left side as viewed in FIG. 2.

Referring again to FIG. 4, rectangular slots 52 and 53 in the platform and rectangular slots 54 and 55 in the pivot plate 23 are provided to allow the shock absorber-type mechanisms 43 and 45, respectively, to be connected to the foot pad 14 and also to allow some horizontal movement of the foot pad and some rotational movement of the shock absorber-type mechanism about the axles 32 and 34. Of course, it will be appreciated that the slots 52 and 53 may be a single oblong slot as may be the slots 54 and 55. The slots 52, 53, 54, and 55 are preferably only slightly wider than the diameter of the shock absorber mechanisms 43 and 45 to prevent excessive cross-movement of the shock absorbers. The undesirable cross-movement may also be limited by further providing rubber gaskets 17 and 19 in the slots 52 and 53, as shown in FIGS. 3 and 4. Thus, as will be seen from the above description, the foot pads 14 and 15 are able not only to move in the vertical direction against the springs of the various shock absorber-type mechanisms and under the movement of the various associated axles, but also in a horizontal front-back direction by virtue of the pivotal connections of the shock absorber-type mechanisms to the axles.

The propulsion of the ski-skateboard may be provided by a rocking motion of the respective foot pads in alternate vertical motion or a simultaneous vertical motion of the foot pads. In the rocking motion alternative, the relative positions of the eccentric portion of each front-back axle pair is manually adjusted to be substantially 180° out-of-phase, i.e., when the front eccentric portion 40 is low, then the rear eccentric portion 41 is high and vice versa.

If alternate depression of the respective foot pads is used to propel the ski-skateboard, then the two front axles and the two rear axles must be manually adjusted in such a way that the respective eccentric portions are maintained 180° out-of-phase as previously described.

Although the wheels attached to the ends of the axles may be described as "fixed" to the ends of the axles, it will be appreciated that the wheels may freely rotate relative to the axle. However, with respect to the wheels attached to the axles having eccentric portions, it will be appreciated the wheel can be rotatable relative to the axle in only one direction. If such were not the case, then the rotation of the axle, for example by the foot pad-shock absorber assembly, would not cause the ski-skateboard to move. Clutch or gearing mechanisms which may be utilized to provide for free rotation in but only one direction are well known conventional devices and are thus not shown in detail in the present disclosure.

Figure 6:
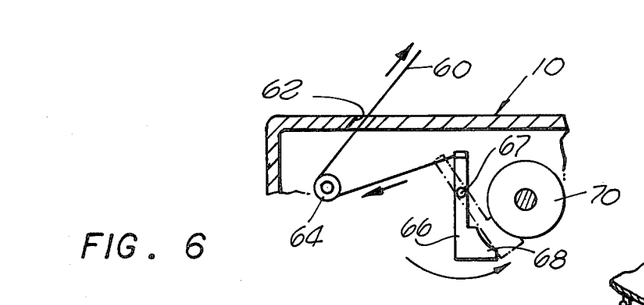
FIG. 6 is a further elevation detail of the brake mechanism illustrated in FIG. 5.

Referring now to FIGS. 5 and 6, the present invention may also be provided with a brake mechanism which comprises a cord 60 which passes through a slot 62 in the forward position of the platform 10. The cord passes around a pulley 64 attached to the central flange 18 and is secured to one end of a pivot brake arm 66. A brake shoe 68 is mounted on the other end of the brake arm 66 for engagement with a brake wheel 70 fixed to rotate with one of the axles, for example, axle 32, when tension is applied to the cord 60. Fixed to the central flange 18 and to the brake arm 66 and positioned around a pivot axle 67 is a spring 69 which maintains the brake shoe 68 disengaged from the brake wheel 70 unless the cord 60 is being continuously pulled. Of course, any other brake mechanism well known in the art may be used.

Figure 14:
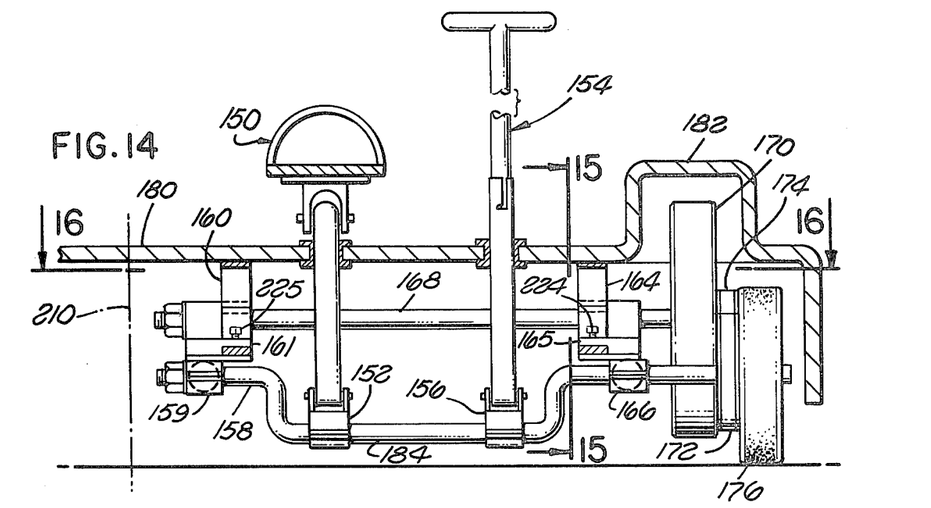
FIG. 14 is a front, right side section plan view of a skateboard wherein the suspension apparatus comprises, for each axle, a pair of leaf-type springs connected at spaced positions, to the axle.
Figure 15:
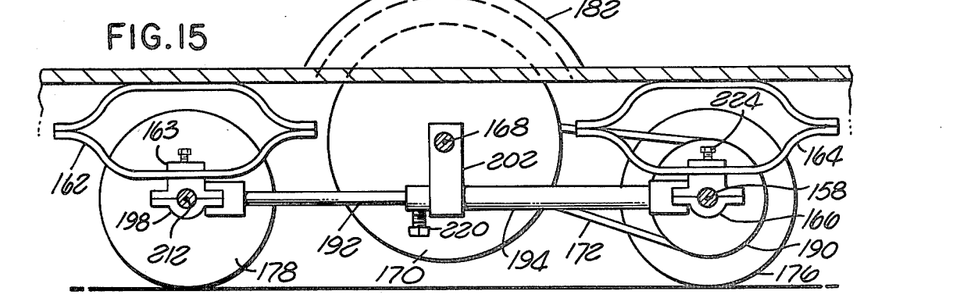
FIG. 15 is a side plan view through section 15—15 of FIG. 14 which shows the leaf spring suspension embodiment which also shows an alternative flywheel interconnection.
Figure 16:
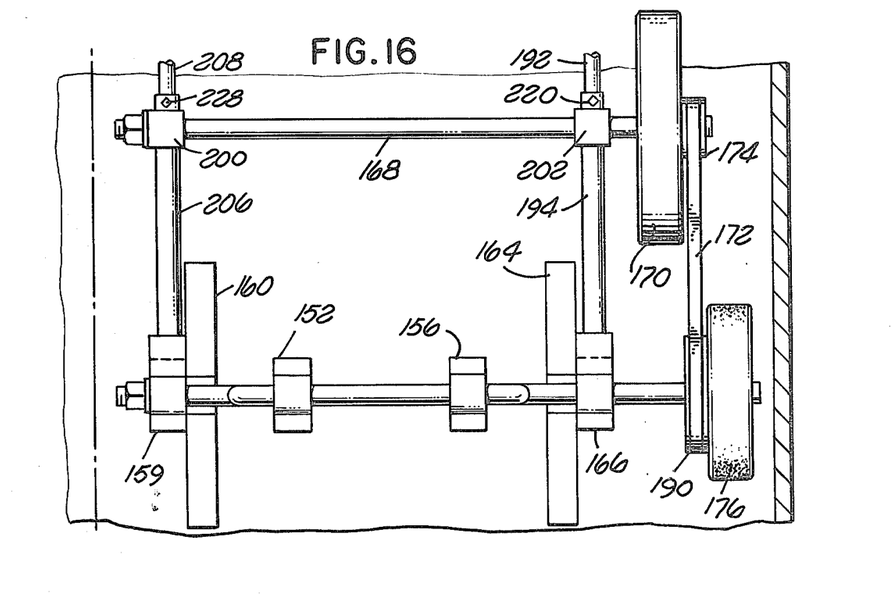
FIG. 16 is a bottom plan view through the section 16—16 of FIG. 14 showing the support arrangement for the flywheel.

Referring now to FIG. 7, a rotatable flywheel 78 may also be provided. Such a flywheel may be secured to one or both sides of the central flange 18 on an axle 72 mounted to protrude either from one or both sides of the flange 18 between the axles 32 and 34. The flywheel may be driven by a sprocket 74 connected to the shaft 32 and a sprocket 75 connected to the axle 72 with a connecting chain 76 so that the flywheel is rotated by the shaft 32. A conventional clutch mechanism 79 is also provided between the axle 72 and the flywheel 78 to allow the flywheel to continue rotating at a high speed as the axle 32 decreases its rotational speed. An alternative flywheel arrangement is shown in FIGS. 14 through 16 to be described hereafter.

Figure 8:
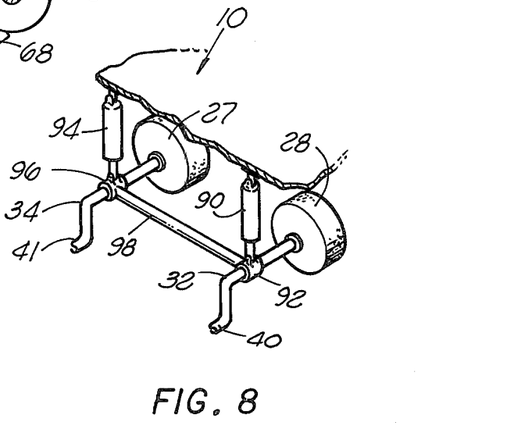
FIG. 8 is a partial-sectional perspective view showing another embodiment of the present invention which incorporates shock absorbers attached to the platform rather than pivot plates attached to the flange.

Referring now to FIG. 8, an alternative embodiment of the present invention is illustrated where the pivot plates 23 and 25, as shown in FIG. 3, have been replaced by an alternative attachment means for movably attaching the pair of axles to the platform.

This alternative attachment means comprises essentially a pair of additional rod and sleeve shock absorber-type apparatus which are coupled directly between the platform 10 and the respective axles 32 and 34. More specifically, a first shock absorber-type device 90 is fixed to the bottom surface of the circular platform 10 with the other end of the shock absorber-type device 90 connected to the axle 32 by a bearing 92 at a point between the eccentric portion 40 and the wheel 28.

Similarly, a second shock absorber-type device 94 is fixed to and depends from the bottom surface of the circular platform 10 and is attached to the axle 34 by a bearing 96 at a point on the axle 34 between the eccentric portion 41 and the wheel 27. In order to maintain the axles 32 and 34 in a fixed relationship relative to one another, a brace 98 is fixed between the bearing 92 and the bearing 96. With such an arrangement, the axles 32 and 34 can move to a limited extent vertically relative to the surface of the platform 10. Similar independent attachment means is provided on the opposite side of the central flange 18.

Figure 9:
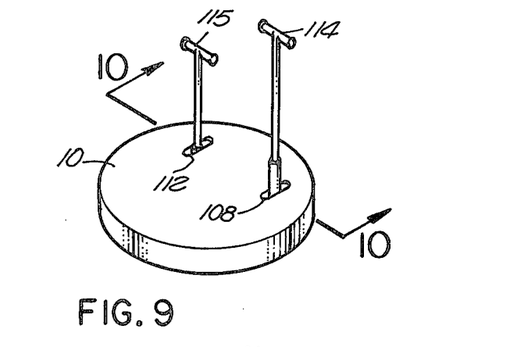
FIG. 9 is a pictorial view illustrative of the platform when just a hand propulsion mechanism is incorporated.

Although the prior description has referred to a skateboard which is powered by foot, it will be appreciated that a hand powered embodiment is also possible without departing from the essence of the invention. For example, in FIG. 9 a skateboard apparatus in accordance with a hand operated embodiment of the present invention comprises a platform 10. A first handle 114 is coupled through a first slot in the platform 10 and a second handle 115 is coupled through a second slot 112 in the platform 10.

Figure 10:
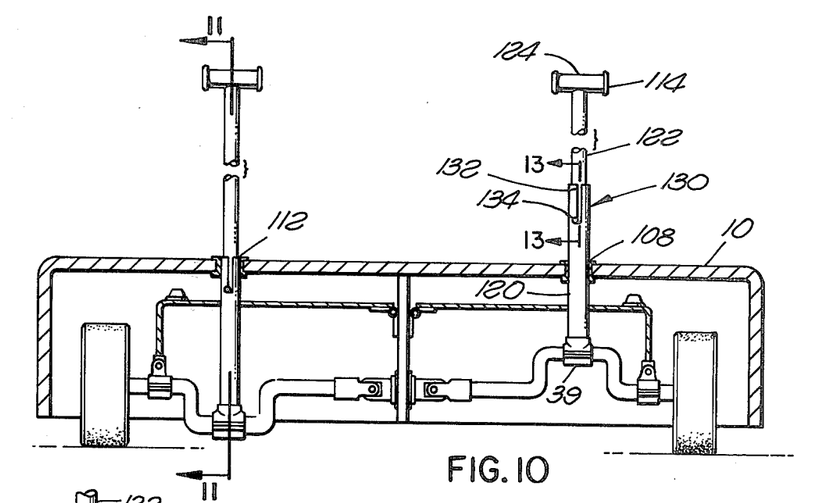
FIG. 10 is a cross-sectional plan view taken along the section 10—10 of FIG. 9 showing the suspension assembly for the hand propulsion embodiment of the present invention.

Referring now to FIG. 10, a skateboard assembly is shown substantially as described in conjunction with FIG. 3. However, rather than having shock absorber assemblies such as shock absorber assembly 43, a hollow connecting member is provided to which a handle may be removably attached. By way of illustration, in FIG. 10 a hollow connecting cylinder or sleeve 120 is affixed to the bearing member 39 to extend through the slot 112 in the platform 10. The handle apparatus 114 has a rod 122 attached to and extending from a horizontal handle member 124. In the preferred embodiment, the rod 122 is coupled to the sleeve 120 utilizing a bayonet-like joint 130.

Figures 11, 13:
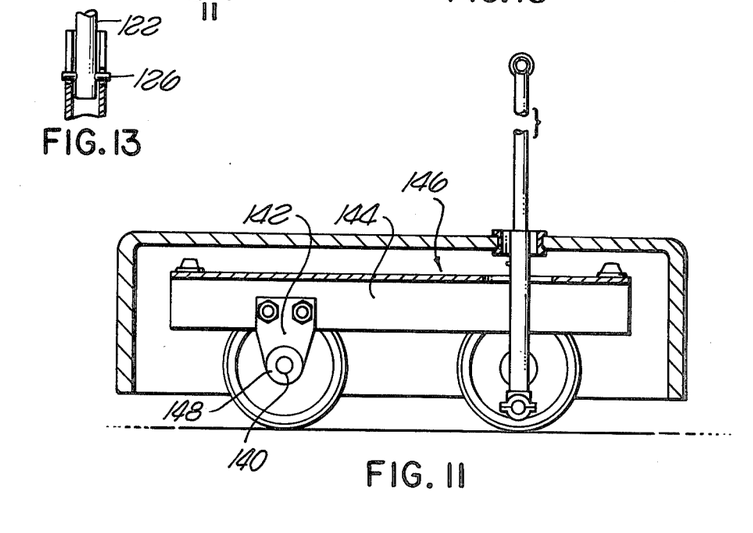
FIG. 11 is a cross-sectional plan view taken along the section 11—11 of FIG. 10 which in particular shows the mechanism by which the rear axle may be attached to the suspension assembly.
FIG. 13 is a detail through section 13—13 of FIG. 10 showing the cross member mechanism of the bayonet joint utilized to attach the handle to the suspension assembly in the hand-operated embodiment of the present invention.

Referring to FIG. 13, the bayonet-like joint 130 is shown in cross-section through section 13—13 of FIG. 10 where the handle rod 122 has a perpendicularly extending pin 126 in a modified T-head arrangement. Referring again to FIG. 10 the rod 122 is inserted into the sleeve 120 with the pin portion 126 moving vertically along a vertical slot 132 in the sleeve 120. When the pin 126 reaches the bottom of the vertical slot, the handle is twisted to cause the pin 126 to move a short distance along a horizontal slot 134 thereby locking the handle 114 into the sleeve 120.

Referring to FIG. 11 a cross-section of the skateboard assembly through the section 11—11 of FIG. 10 is shown illustrating the rear axle 140 which does not have an eccentric portion. In addition, the rear axle may be bolted directly to the downwardly extending portion 144 of the horizontally extending suspension member 146 utilizing a bolt and connector apparatus 142. The bolt-connector apparatus 142 is connected directly to a bearing assembly 148 which may be a bearing similar to the bearing member 39 shown in FIG. 10.

Figure 12:
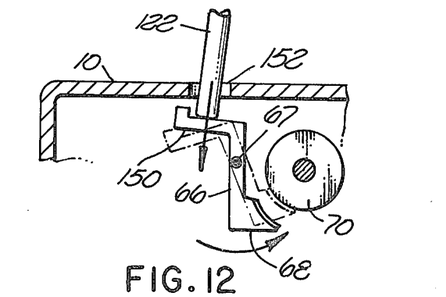
FIG. 12 is a partial cross-sectional plan view illustrating the brake mechanism in accordance with one embodiment of the present invention where the brake mechanism may be activated utilizing a removable handle of the hand propulsion embodiment of the present invention.

In the embodiment where the handles 114 and 115 are removable from the connecting sleeve 120, the brake mechanism described in conjunction with FIGS. 5 and 6, may be modified to eliminate the string activation mechanism. Thus, referring to FIG. 12, an additional slot 152 may be provided in the circular platform 10 through which the end of the rod 122 may pass. The brake arm 66 to which the brake shoe 68 is mounted, remains attached and pivotal on the pivot axle 67. However, in this embodiment, the pivot brake arm 66 is provided with a perpendicular arm portion 150 which is positioned below the slot 152. Thus, when it is desired to initiate braking, the rod 122 may be detached from the sleeve 120 (see FIG. 10) and inserted through the slot 152 and depressed against the perpendicular pivot arm 150 to cause the brake shoe to press against the brake wheel 70.

Of course, it will be appreciated that the above described hand operated embodiment of the present invention may be combined with the foot operated embodiment so that both motivation means are provided in a single ski-skateboard.

Referring next to FIGS. 14, 15, and 16, a third embodiment of the present invention is shown in which the suspension apparatus provide independently movable sets of axles on either side of the center line of the skateboard. Each axle is supported and attached between two springs which are fixed to the underside of the platform. The springs may be of any type known in the art and may, for example, be leaf springs.

A representative foot pad 150 and hand gripping means 154 are attached to an eccentric portion 184 of, for example, a left front axle 158 utilizing the bearing members 152 and 156 respectively. Similar attachment and motive mechanisms have been previously described in detail in conjunction with the other embodiments of the present invention. It will be appreciated that the illustrative diagrams of FIGS. 14, 15, and 16 refer just to one side of the skateboard apparatus of the present invention and a complimentary suspension assembly is provided on the opposite side of a center line 210 of the platform 180.

The arrangement by which the axle 158 is coupled to the platform 180 is shown in FIG. 15 which is a view through the section 15—15 in FIG. 14. More specifically, a left front outside spring apparatus 164 and a left rear outside spring apparatus 162 are each attached to the bottom of the platform 180. A left front outside bearing 166 is coupled to the lower portion of the left front outside spring 164 and is rotatably coupled to the axle 158 to thereby couple the axle 158 to the spring 164 and hence to the platform 180.

In a similar fashion, the left front inside spring 160 (see FIG. 14) is coupled to the interior end of the left front axle 158 by a bearing member 162 similar to the left front outside bearing member 166. The left rear axle 212 is also coupled to the platform 180 by a pair of left rear spring assemblies. The right suspension assembly (not shown) is analogously configured and will not be described herein in further detail.

In operation, each of the springs supporting opposite ends of each of the axles is, to a certain degree, independently compressible in a vertical plane relative to the plane of the platform 180. Thus, each of the axles is, to some extent, independently movable in a vertical direction relative to the other axles. As illustrated, a left front wheel 176 and a left rear wheel are attached to the ends of the axles 166 and 212 respectively. In addition, as previously described, the wheels affixed to the ends of the axles having eccentric driving portions such as the eccentric portion 184 have a clutch mechanism which allows the wheel to rotate in only one direction. Such an arrangement thus allows the wheel to continue rotating even when the axle 158 is not being rotated by the handle 154 or foot pad 150.

In the preferred embodiment of the present invention, the rear axle 212 and the front axle 158 are maintained at a fixed immovable distance relative to one another in a horizontal plane (parallel to the plane of the platform 180) by a spacer rod means which may incorporate an outside spacer rod assembly fixed between the left front outside bearing 166 and the left rear outside bearing 198 and an inside spacer rod assembly fixed between the corresponding left front and rear inside bearing members. In a preferred embodiment, each of the bearings 159, 166, and 198 has a connecting flange portion, 161, 163, and 165 respectively, with a horizontal slot therein. The lower portion of the springs 160, 162, and 164 are positioned in the slots of the flange portions 161, 163, and 165 respectively so that the respective bearing members 159, 166, and 198 may be slidably positioned along the bottom of the springs 160, 162, and 164 respectively. The suspension assembly may thus be adjusted to achieve the most advantageous mechanical relative positioning of the foot pad 150 as adjusted for various foot sizes, and the suspension assemblies or either side of the centerline 210 of the skateboard.

By way of illustration, in FIG. 15 the left front bearing member 166 is shown adjustably attached to the spring 164 so that the bearing may be slidably moved along the lower portion of the spring 164. When the proper positioning is set, a clamping mechanism is incorporated which, in the embodiment shown, may be a set screw 224, to fix the flange portion 165 and thus the bearing to a particular location along the lower portion of the spring 164. Of course, it will be appreciated that the inside bearing member 159 for the left front axle 184 is also adjustable and has a corresponding set screw 225 which must be tightened. The rear pair of bearings on the rear axle 212 are similarly adjustable back and forth along the bottom portion of the left rear inside and outside leaf spring apparatus.

In order to provide the above adjustment and still maintain a fixed horizontal spacing between the front and rear axles on the respective sides of the skateboard, the outside and inside spacer rod assemblies are adapted to be adjustable. For example, referring to FIG. 15, the outside spacer rod assembly between the left front outside bearing 166 and the left rear outside bearing 198 comprises a hollow tubular member 194 coupled to the left front outside bearing 166 and a rod member 192 which is coupled to the left rear outside bearing 198. The rod 192 is positioned to slide in the hollow tubular member 194. A similar inside spacer rod assembly coupled between the two inside bearings comprises an inside hollow tubular member 206 and a rod 208 which is slidable in the interior of the hollow tubular member 206. In order to provide a fixed distance between the front and the rear axles, a set screw 220 is provided and inserted in a threaded hole in the hollow spacer rod 194 so that the rod 192 may be slidably positioned in the interior hollow portion of the rod 194 until the proper spacing is achieved and then the set screw 220 tightened to maintain that positioning. A similar set screw arrangement 228 is provided for the inside spacer rod assembly.

An alternative arrangement of incorporating the flywheel apparatus comprises attaching a flywheel axle 168 between an inside bearing 200 fixed to the hollow spacer rod portion 206 and a second bearing member 202 coupled to the outside hollow spacer rod member 194 (see FIG. 16). A flywheel 170 is then fixed to the outside end of the axle 168. Alternatively, the wheel 170 may be provided with a bearing so that the wheel rotates relative to the axle 168. In such a configuration, the axle 168 may be fixed to the spacer rods 206 and 194 and need not be rotatable relative thereto.

In order to cause the flywheel 170 to rotate, a belt and pulley arrangement is incorporated, whereby a pulley 190, having a diameter less than the diameter of the wheel, is fixed to the left front outside wheel 176 to be rotatable therewith. A second pulley 174 is fixed to the side of the flywheel 170 with a belt 172 coupled between the pulley 190 and the pulley 174. In operation, as the wheel 176 is rotated, the pulley 190 is rotated causing the belt 172 to rotate the pulley 174 and hence the flywheel 170. A clutch mechanism is incorporated as part of the coupling between the pulley 174 and the flywheel 170 so that if the rotation of the wheel 176 slows down, the flywheel 170 will continue rotating at a higher rate and will not be slowed down by the slower rotational speed of the belt and pulley apparatus. Clutch assemblies which will perform this function are well known in the art.

While various details have been disclosed with respect to the above-identified embodiment, it will be appreciated that such details may be varied without affecting the essence of the present invention. For example, the suspension springs 160, 162, and 164 may be coil-type springs or a differently configured leaf-type spring. In addition, the flywheel may be driven by two belt and pulley apparatus, one interconnected to the front wheel and another interconnected to the rear wheel. Furthermore, the foot pad and handle apparatus need not be simultaneously incorporated at the eccentric portion of the axle but may be separately utilized on one or more of the axles of the present invention. Of course, it will be appreciated that many other such modifications may be without departing from the spirit of the invention. Consequently, although the present invention has been described with reference to specific details, such details are intended to be taken as illustrative only and not limiting.

What is claimed is:

1. A skateboard apparatus comprising:
    a platform having at least one slot therethrough;
    a suspension means interconnected to the platform, the suspension assembly comprising:
        a first set of axles positioned on a first side of the platform and a second set of axles, positioned on a second side of the platform, each axle interconnected to the platform and rotatable about its longitudinal axis, at least one of the axles having an eccentric portion along its length, the first set of axles being independently moveable relative to the second set of axles in a vertical plane relative to the plane of the platform, a plurality of wheels, one attached to at least one end of each axle, each wheel attached to the end of an axle having an eccentric portion, being adapted for rotating freely in only one direction;
    at least one drive means rotatably connected to the eccentric portion of one of the axles having an eccentric portion, the drive means extending through the slot in the platform for being reciprocated by an operator to impart rotation to the attached axle.

2. The skateboard apparatus of claim 1 further comprising a flywheel assembly comprising a flywheel mounted for being rotated in response to the rotation of at least one of the axles and a clutch apparatus connected to the flywheel for allowing the flywheel to rotate at an angular velocity greater than the angular velocity of the axle interconnected to rotate the flywheel.

3. The skateboard apparatus of claim 1 further comprising a brake apparatus having a brake shoe interconnected for applying pressure against at least one of the axles for slowing the rotation of the axle.

4. The skateboard apparatus of claim 1 wherein the platform further comprises a downwardly depending flange and the suspension assembly further comprises:
   means for pivotally attaching one end of each of the first set of axles, remote from the respectively attached wheels, to one side of the flange;
   means for pivotally attaching one end of each of the second set of the axles, remote from the respectively attached wheels, to the other side of the flange, the axles being rotatable relative to the flange and each axle being pivotally mounted relative to the flange;
   a first pivot plate hinged along a first of its edges to the one side of the flange for pivoting about an axis in the plane of the flange, the first set of axles being rotatably attached to the first pivot plate at fixed spaced locations along a second of its edges generally parallel to the first of its edges; and
   a second pivot plate hinged along a first of its edges to the other side of the flange for pivoting about an axis in the plane of the flange, the second set of axles being rotatably attached to the second pivot plate at fixed spaced locations along a second of its edges generally parallel to the first of its edges.

5. The skateboard apparatus of claim 4 wherein the first and second sets of axles comprises a first and second pair of axles, at least one axle from each pair having an eccentric portion, the drive means further comprising:
   a first foot pad positioned above a top surface of the platform remote from the wheels;
   a second foot pad positioned next to the first foot pad and positioned above the top surface of the platform;
   first interconnect means comprising, for each axle in the first pair having an eccentric portion, a first shock absorber assembly interconnected between the eccentric portion and a bottom portion of the first foot pad; and
   second interconnect means comprising, for each axle in the second pair having an eccentric portion, a second shock absorber assembly interconnected between the eccentric portion and a bottom portion of the second foot pad.

6. The skateboard apparatus of claim 5 wherein each of said shock absorber assemblies comprises:
   a hollow sleeve having at least one slot longitudinally positioned along the hollow sleeve;
   an inner rod for positioning in the hollow sleeve; and
   a pin connected to said inner rod and extending through the slot in the hollow sleeve for limiting the longitudinal motion of the inner rod relative to the hollow sleeve.

7. The skateboard apparatus of claim 4 wherein the first and second sets of axles comprises a first and second pair of axles, each pair having a front axle, with an eccentric portion, and the drive means further comprises:
   a first handle apparatus interconnected to the eccentric portion of the front axle of the first pair of axles, and a second handle apparatus interconnected to the eccentric portion of the front axle of the second pair of axles.

8. The skateboard apparatus of claim 7 wherein each handle apparatus comprises a first rod-like member having a gripping means at one end and a first connector portion at the other end, and a bearing means rotatably attached to the eccentric portion, the front axle and a second rod-like member attached to the bearing means, the second rod-like member having a second connector portion adapted to engage the first connector portion for removably coupling the first rod-like member and the second rod-like member.

9. The skateboard apparatus of claim 1 wherein the platform further comprises a downwardly depending flange and the suspension assembly further comprises:
   means for pivotally attaching one end of each of the first set of axles, remote from the respectively attached wheels, to one side of the flange;
   means for pivotally attaching one end of each of the second set of axles remote from the respectively attached wheels to the other side of the flange, each of the axles being rotatable relative to the flange;
   first vertical position varying means interconnected between the platform and the first set of axles at a location remote from the flange, each axle in the first set of axles being rotatable relative to the first vertical position varying means;
   second vertical position varying means interconnected between the platform and the second set of axles at a location remote from the flange, each axle in the second set of axles being rotatable relative to the second vertical position varying means;
   first spacer means interconnected between the axles in the first set of axles at a location remote from the flange, for maintaining a substantially constant spacing between the axles in the first set of axles; and
   second spacer means interconnected between the axles in the second set of axles at a location remote from the flange for maintaining a substantially constant spacing between the axles in the second set of axles.

10. The skateboard apparatus of claim 9 wherein each axle in the first set of axles is substantially independently movable in the vertical plane relative to other axles in the first set of axles.

11. The skateboard apparatus of claim 9 wherein the first and second sets of axles comprises a first and second pair of axles, at least one axle from each pair having an eccentric portion, the drive means further comprising:
   a first foot pad positioned above a top surface of the platform remote from the wheels;
   a second foot pad positioned next to the first foot pad and positioned above the top surface of the platform;
   first interconnected means comprising, for each axle in the first pair having an eccentric portion, a first shock absorber assembly interconnected between the eccentric portion and a bottom portion of the first foot pad; and
   second interconnect means comprising, for each axle in the second pair having an eccentric portion, a second shock absorber assembly interconnected between the eccentric portion and a bottom portion of the second foot pad.

12. The skateboard apparatus of claim 11 wherein each of said shock absorber assemblies comprises:
   a hollow sleeve having at least one slot longitudinally positioned along the hollow sleeve;
   an inner rod for positioning in the hollow sleeve; and
   a pin connected to said inner rod and extending through the slot in the hollow sleeve for limiting the longitudinal motion of the inner rod relative to the hollow sleeve.

13. The skateboard apparatus of claim 9 wherein the first and second sets of axles comprises a first and second pair of axles, each pair having a front axle, with an eccentric portion, and the drive means further comprises:
   a first handle apparatus interconnected to the eccentric portion of the front axle of the first pair of axles, and a second handle apparatus interconnected to the eccentric portion of the front axle of the second pair of axles.

14. The skateboard apparatus of claim 13 wherein each handle apparatus comprises a first rod-like member having a gripping means at one end and a first connector portion at the other end, and a bearing means rotatably attached to the eccentric portion, the front axle and a second rod-like member attached to the bearing means, the second rod-like member having a second connector portion adapted to engage the first connector portion for removably coupling the first rod-like member and the second rod-like member.

15. The skateboard apparatus of claim 1 wherein the suspension assembly comprises for each axle:
   first spacer means for maintaining a substantially constant spacing between the axles in the first set of axles;
   second spacer means for maintaining a substantially constant spacing between the axles in the second set of axles;
   a first vertically resilient means interconnected between the platform and a first region of the axle remote from the wheel; and
   a second vertically resilient means interconnected between the platform and a second region of the axle remote from the first region, the axle being rotatable relative to the first and second resilient means.

16. The skateboard apparatus of claim 15 wherein each axle in the first set of axles is substantially independently movable in the vertical plane relative to other axles in the first set of axles.

17. The skateboard apparatus of claim 15 wherein the first and second sets of axles comprises a first and second pair of axles, at least one axle from each pair having an eccentric portion, the drive means further comprising:
   a first foot pad positioned above a top surface of the platform remote from the wheels;
   a second foot pad positioned next to the first foot pad and positioned above the top surface of the platform;
   first interconnect means comprising, for each axle in the first pair having an eccentric portion, a first shock absorber assembly interconnected between the eccentric portion and a bottom portion of the first foot pad; and
   second interconnect means comprising, for each axle in the second pair having an eccentric portion, a second shock absorber assembly interconnected between the eccentric portion and a bottom portion of the second foot pad.

18. The skateboard apparatus of claim 17 wherein each of said shock absorber assemblies comprises:
   a hollow sleeve having at least one slot longitudinally positioned along the hollow sleeve;
   an inner rod for positioning in the hollow sleeve; and
   a pin connected to said inner rod and extending through the slot in the hollow sleeve for limiting the longitudinal motion of the inner rod relative to the hollow sleeve.

19. The skateboard apparatus of claim 15 wherein the first and second sets of axles comprises a first and second set of axles, each pair having a front axle, with an eccentric portion, and the drive means further comprises:
   a first handle apparatus interconnected to the eccentric portion of the front axle of the first pair of axles, and a second handle apparatus interconnected to the eccentric portion of the front axle of the second pair of axles.

20. The skateboard apparatus of claim 19 wherein each handle apparatus comprises a first rod-like member having a gripping means at one end, and a first connector portion at the other end, and a bearing means rotatably attached to the eccentric portion, the front axle and a second rod-like member attached to the bearing means, the second rod-like member having a second connector portion adapted to engage the first connector portion for removably coupling the first rod-like member and the second rod-like member.

* * * * *